United States Patent
Sievers et al.

(10) Patent No.: US 6,167,879 B1
(45) Date of Patent: Jan. 2, 2001

(54) PROCESS FOR PRODUCING NON-SLIP FLOOR COVERING

(75) Inventors: Thomas Sievers, Rullstorf; Günter Wiedemann, Dresden; Udo Stürmer, Tharandt, all of (DE)

(73) Assignee: Fraunhofer-Gesellschaft zur Forderung der angewandten Forschung e.V., Munich (DE)

( * ) Notice: Under 35 U.S.C. 154(b), the term of this patent shall be extended for 0 days.

(21) Appl. No.: 08/952,108

(22) PCT Filed: Apr. 18, 1996

(86) PCT No.: PCT/DE96/00703

§ 371 Date: Dec. 10, 1997

§ 102(e) Date: Dec. 10, 1997

(87) PCT Pub. No.: WO96/36469

PCT Pub. Date: Nov. 21, 1996

(30) Foreign Application Priority Data

May 18, 1995 (DE) .............................................. 195 18 270

(51) Int. Cl.[7] .................................................... B28D 1/00

(52) U.S. Cl. ................................................. 125/1; 125/38

(58) Field of Search ................... 125/30.01, 38; 219/121.67, 121.68, 121.69, 121.73

(56) References Cited

U.S. PATENT DOCUMENTS

| | | | |
|---|---|---|---|
| 4,392,476 | * | 7/1983 | Gresser et al. . |
| 4,518,641 | * | 5/1985 | Shimmin et al. . |
| 4,559,115 | * | 12/1985 | Inoue . |
| 4,622,257 | * | 11/1986 | Thompson . |
| 4,960,495 | | 10/1990 | Mori et al. . |
| 5,246,530 | | 9/1993 | Bugle . |
| 5,686,507 | * | 11/1997 | Hermele et al. . |

FOREIGN PATENT DOCUMENTS

| | | |
|---|---|---|
| 3139427 | 9/1982 | (DE) . |
| 3342266 | 5/1985 | (DE) . |
| 3545064 | 6/1987 | (DE) . |
| 3933843 | 4/1991 | (DE) . |
| 4038048 | 6/1991 | (DE) . |
| 0300224 | 1/1989 | (EP) . |
| 2206614 | 1/1989 | (GB) . |

OTHER PUBLICATIONS

DIN 51097– Determining Slip–Resistant Characteristics–Barefoot Walking Areas in Which Wetness Occurs–Walk Methods–Sloping Area.
DIN 51130– Determining Slip–Resistant Characteristics–Work Areas and Spaces With an Elevated Slip–Risk–Walk Method–Sloping Area.
Fb 701 Comparative Test With Measuring Stationary Coefficient of Friction on Floors (publication series Federal Agency for Employment Safety).
Information Bulletin of Federal Association for Slip–Resistance, Dept. Public Relations Work.
Fertigungsmeβtechnik, Handbook für Industrie und Wissenschraft, Warnecke, H.J. Dutschke, W. , Springer–Verlag Berlin Heidelberg.
New York Tokyo 1984.

(List continued on next page.)

Primary Examiner—Timothy V. Eley
(74) Attorney, Agent, or Firm—Greenblum & Bernstein P.L.C.

(57) ABSTRACT

Non-slip floor covering and method of producing a non-slip floor covering. The non-slip floor covering includes a plurality of depressions that are regularly or randomly distributed over a floor covering surface such that the depressions provide a suction effect. The method includes directing pulsed laser beams onto a surface of the floor covering, forming micro-craters having suction effect with the directed pulsed laser beams, and distributing the formed micro-craters over the surface of the floor covering.

22 Claims, 1 Drawing Sheet

OTHER PUBLICATIONS

ZH 1/571—Explanatory Notes on Floor Coverings Used in Work Areas and Spaces with Slip Risk.

GUV 26.17—Explanatory Notes of the Federal Association of Public Accident Insurance Carriers BAGUV—On Floor Coverings for Barefoot Walking Areas in which Wetness Occurs.

R. Skiba et al., "Vergleichsuntersuchung zur Instationären Reibzahlmessung auf Fußböden," *KGK Kautschuk Gummi Kunstoffe*, vol. 47, No. 7/94, pp. 513–518 (1994).

Patent Abstracts of Japan, vol. 95, No. 001.

Copy of International Preliminary Examination Report and Transmittal page dated Feb. 19, 1998.

J. Hauptmann et al. "Lasermikrostrukturierung–eine Möglichkeit der rutschhemmenden Ausrüstung polierter Natursteinoberflächen", (Jul. 14, 1999) pp. 1–13.

Sievers et al. "Laserstrukturieren– eine Möglichkeit der rutschhemmenden Ausrüstung von polierten Natursteinoberflächen" ECLAT'96 pp. 955 to 962.

Trittsicherheit hat eine neue rechtliche Plattform erhalten. Eine unserer Aufgaben ist es, Sie Ausführlich darüber zu informieren. Oct. 1, 1993 4 pages.

\* cited by examiner-

PROCESS FOR PRODUCING NON-SLIP FLOOR COVERING

CROSS REFERENCE TO RELATED APPLICATION

The present application claims priority under 35 U.S.C. § 119 of German Patent Application No. 195 18 270.7, filed May 18, 1995.

BACKGROUND OF THE INVENTION

1. Field of the Invention

The invention relates to a non-slip floor covering and a method for its production. The special field of application of the invention concerns highly polished floor coverings, especially of mineral materials, such as stone (e.g., granite) or ceramic, which are frequently used in public buildings or buildings accessible by the public. Slipping is one of the most frequent cause of accidents in Germany. In most cases, the severity of such accidents is underestimated. In order to increase the degree of slip-resistance, both the soles of shoes and the floors must be slip-resistant. This is necessary, above all, where slide-supporting media are used on the floor. In many areas of public life, as well as in private homes, it is customary to use polished, shiny tiles made of natural stone as a representative floor covering both in dry and wet areas, as well as in foyers. It is necessary to align the slip-resistant characteristics with architectural esthetics. Slip resistance is evaluated in accordance with [DIN 51097—Determining slip-resistant characteristics—barefoot walking areas in which wetness occurs—walk methods—sloping area and DIN 51130—Determining slip-resistant characteristics—work areas and spaces with an elevated slip risk—walk method—sloping area] by means of a sloping area.

2. DISCUSSION OF BACKGROUND INFORMATION

Measuring devices exist for measuring the stationary coefficient of friction [Fb 701 comparative test with measuring stationary coefficient of friction on floors (publication series Federal Agency for Employment Safety)].

There are various methods for creating or increasing the slip-resistant characteristics of floor coverings of natural stone. Their use largely depends on where the floor covering is to be installed or has been installed (interiors, exteriors, degree of contamination to be anticipated, etc.). The following is a short description of the most the important methods.

During blasting, the desired roughness of the corresponding blasting material is cast onto the surface at high pressure. The blasting material, the hardness of which varies to a greater or lesser degree, produces irregular rough surfaces with a high degree of surface matting [DE 31 39 427].

Flame blasting produces high-energy fuel gas oxygen flames which subject the surface to be treated temporarily with a high degree of heat. The effect of the flames produces a blasting of the quartz in the upper stone region, as well as a melting of the stone sections which subsequently vitrify and adhere relatively loosely to the surface [DE 35 45 064].

Granulation is performed by means of a granulating tool (granulating hammer) which is provided with a multitude of evenly-aligned chiseling tips. While continuously moving the workpiece, the granulating hammer is impacted on the surface with a given frequency [DE 39 33 843].

The above described and similar methods, using abrasive agents or chisel-type tools, result in increased slip-resistance, while, in terms of manufacturing, surfaces are produced which are less polished, with a considerable loss of shine and, consequently, a decrease in esthetic value.

Coating surfaces, in order to increase slip resistance, results in burls on the processed surfaces to be processed [DE 33 42 266]. This method, however, only produces minor optical changes but only has a limited surface life due to inevitable abrasion.

During the chemical etching process of natural stone surfaces, above all, the feldspar components are attacked by the hydrofluoric acid-containing substances, [Information Bulletin of Federal Association for Slip-Resistance, Dept. Public Relations Work]. The damage only extends to a few micrometers, while the quartz is largely left unharmed. The loss of shine depends on the period of reaction, the change in the overall optic effect must be tested on a test surface. Currently, this method is the most practical for increasing the slip resistance of polished natural stone floors. However, this is restricted to the use of mineral floor coverings. Chemical compounds in concentrations must be adjusted to the various types of floor coverings. Due to long periods of reaction and exact adherence to concentrations, using this method for the production of tiles is either unsuitable or involves extremely high expenditure. This method is not readily suitable for plastic floor coverings. Improper handling and disposal of the hydrofluoric acid-containing substance involves increased environmental and labor protection risks.

SUMMARY OF THE INVENTION

It is the object of the present invention to provide a non-slip floor covering the surface of which can be highly polished, and a method for producing said floor covering which does not have all the disadvantages of the prior art.

It thus is the object of the present invention to propose a non-slip floor covering of the aforesaid type which, in spite of slip-resistance, has no optical disadvantages in terms of its highly-polished surface and which can be produced by a simple non-polluting method.

Further, it is the object of the present invention to develop a method of the aforesaid type which produces slip-resistance at the site of production rather than during after treatment at the site of installation of the floor covering, which is simple and non-polluting and completely retains the optical effect and esthetics of the surface of the floor covering.

Accordingly, the present invention may be directed to a non-slip floor covering that includes a plurality of depressions regularly and randomly distributed over the floor covering such that the depressions provide a suction effect.

In accordance with another feature of the present invention, the plurality of depressions may be flat micro-craters.

In accordance with another feature of the present invention, the plurality of depressions may be substantially invisible to a human eye.

In accordance with still another feature of the present invention, the plurality of depressions may be sharp-edged.

In accordance with still another feature of the present invention, the plurality of depressions may have a lens-shaped geometry.

In accordance with a further feature of the present invention, the plurality of depressions may have a maximal width of 0.4 mm and a depth of between 0.01 and 0.2 mm.

In accordance with a still further feature of the present invention, the regular and random distribution of the plurality of depressions may include more than 100 depressions per $cm^2$. Further, the floor covering may be composed of a mineral material. When the mineral material is composed of granite, the distribution of the plurality of depressions may include more than 250 depressions per $cm^2$.

In accordance with another feature of the present invention, the floor covering may be composed of a mineral material, and the mineral material may be selected from the group consisting of granite, stone and ceramic.

The present invention may also be directed to a method for producing a non-slip floor covering. The method may include directing pulsed laser beams onto a surface of the floor covering, forming micro-craters having suction effect with the directed pulsed laser beams, and randomly and regularly distributing the formed micro-craters over the surface of the floor covering.

In accordance with another feature of the present invention, the method may include selecting laser beam parameters as a function of the material of the floor covering, and the forming of micro-craters may include evaporating the material of the floor covering in accordance with the selected laser beam parameters. Further, the floor covering may be composed of a highly-polished granite material, and the method may further include selecting pulse energy ranges for the laser beam between 0.4 mJ and 1.5 mJ, selecting a pulse length between 50 ns and 250 ns, forming a diameter for micro-craters of between 0.05 mm and 0.2 mm, and providing a distance of between 0.25 and 0.8 mm between micro-craters.

In accordance with still another feature of the present invention, the floor covering may be composed of a highly-polished natural stone material, and the method may further include selecting pulse energy ranges for the laser beam between 0.4 mJ and 1.5 mJ, selecting a pulse length between 50 ns and 250 ns, forming a diameter for micro-craters of between 0.05 mm and 0.2 mm, and providing a distance of between 0.25 and 0.8 mm between micro-craters.

In accordance with a further feature of the present invention, the method may further include moving the beam in a first direction across the floor covering with one of a scanning device and deflection optics, and moving the beam in a second direction with a transport device for the floor covering. The first direction may be substantially perpendicular to the second direction.

In accordance with still another feature of the present invention, the directing of the pulsed laser beams may include deflecting the pulsed laser beams with a focus mirror and positioning the focus mirror to concentrate the pulsed laser beams onto the surface of the floor covering.

In accordance with yet another feature of the present invention, the distributing of the plurality of micro-craters being one of randomly distributed and regularly distributed.

Other advantageous embodiments and features of the present invention may be ascertained by reviewing the following detailed description of the present invention and the accompanying figures.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

According to the invention, the non-slip floor covering, especially of mineral materials, such as stone, granite, with highly polished surface, is additionally slip-resistant with a highly polished surface. This is achieved in that on the highly polished floor covering surface are provided regularly or randomly distributed depressions (micro-craters) with suction effect, which preferably are lens-shaped, sharp-edged, flat and invisible to the human eye. Invisible means, in this case, that the micro-craters cannot be seen with the human eye from a certain distance due to the eye's resolution. The threshold of resolution in people with normal sight and under optimal lighting conditions occurs approximately for one angular minute [Warnecke, H. J.; Dutschke, W.; Fertigungsmeβtechnik, Handbuch für Industrie und Wissenschaft, Springer-Verlag Berlin Heidelberg New York Tokyo 1984]. This means that from a minimal distance of observation of 1.5 m (upright, adult person) a crater with a maximum lateral extension of 0.44 mm can barely be seen. Preferably, these micro-craters have a diameter of 0.03–0.4 mm and a depth of 0.01–0.2 mm. With floor tiles, the preferred number of micro-craters per $cm^2$ is 100. (Granite floor tiles with more than 250 micro-craters produce favorable results).

Figure 1:
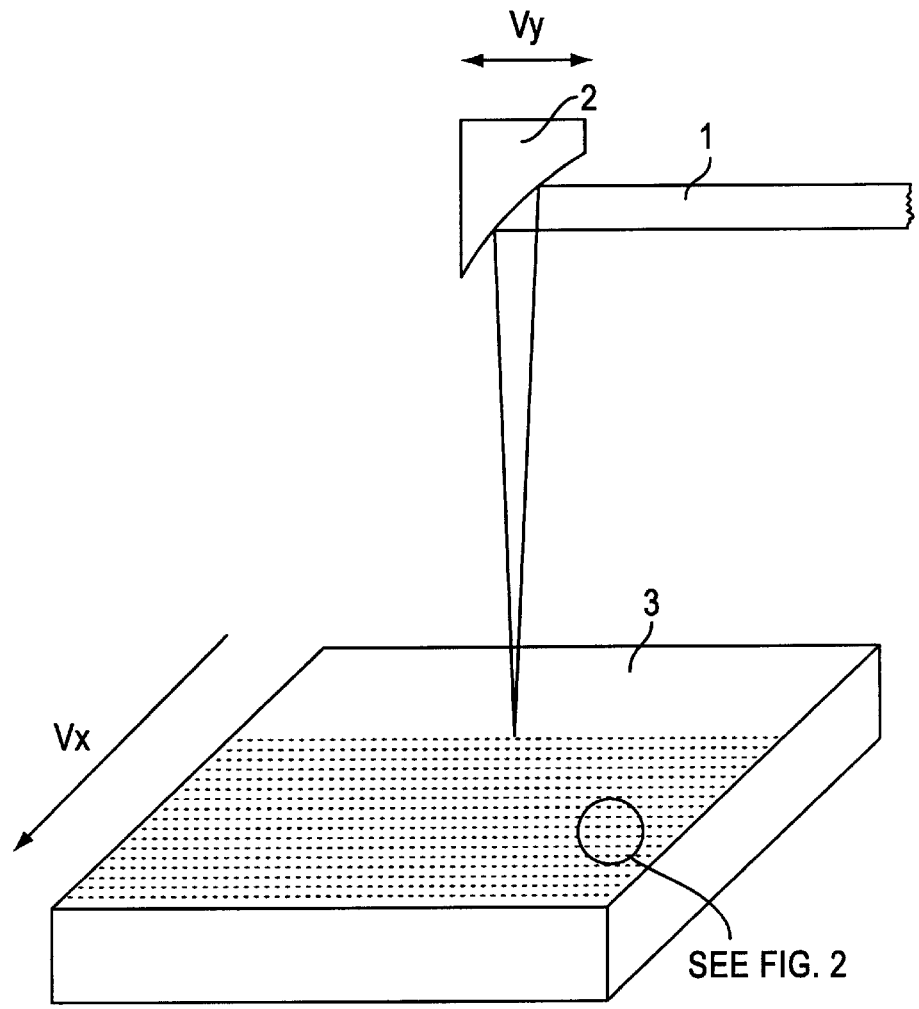
FIG. 1 illustrates an application of micro-craters.
Figure 2:
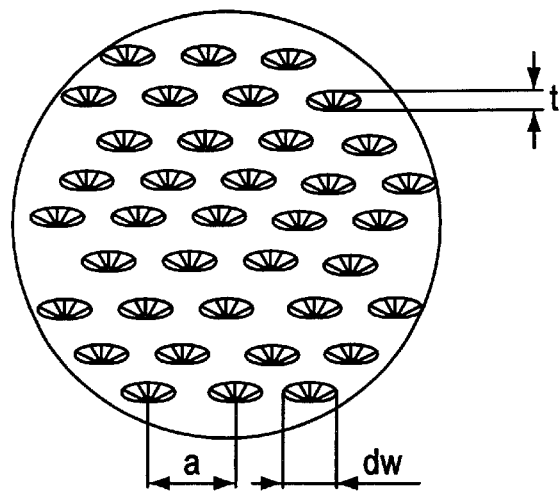
FIG. 2 illustrates a detailed view of a micro-crater.

The inventive non-slip floor covering with high-polish surface is produced by means of pulsed laser irradiation, as illustrated in FIG. 1. According to the invention, the targeted action of pulsed laser beams of lens-shaped and sharp-edged micro-craters, see FIG. 2, which are invisible to the human eye and produce a suction effect, are statistically distributed and produced in an irregular configuration. The laser beam parameters, such as energy density, pulse length, etc., are so selected as a function of the material of the floor covering that the erosion of material producing the micro-crater occurs. For example, an Nd: YAG-laser may be utilized having an energy density of 17 $J/cm^2$, a pulse length of 130 ns, and focal length of 150 mm. The laser beam 1 may be focused on the workpiece (floor tile) surface 3, e.g., polished granite (Lausite), via a focus mirror 2. The present invention may utilize one impulse per generated crater to provide a diameter $d_w$ of, e.g., between 0.04 and 0.45 mm, a depth t of, e.g., 0.1 mm.

Further, the laser focus and the workpiece may be moved relative to each other via scanning or deflection optics in the y-direction at a deflection speed $V_y$ and by workpiece transporting devices in the x-direction at a deflection speed $V_x$ to provide a distance a of, e.g., 0.5 mm, between craters in the x- and y-directions.

As a result of the generation of micro-craters on the workpiece, the workpiece may have a coefficient of friction $\mu$ of, e.g., 0.47 (measured with FSC 200, plastic sliding elements and a slip additive: low-surface tension water), and a loss of shine of, e.g., less than 11%. Accordingly, the workpiece may be rendered slip resistant under the effect of water, and retain optimal optical quality. Thus, these workpieces may be utilized in, e.g., entrance areas of hotels.

When treating a highly-polished surface of a floor covering made of natural stone, such as granite, the pulse energy ranges from 0.4 mJ to 1.5 mJ, the pulse length from 50 ns to 250 ns, the spot diameter from 0.05 mm to 0.2 mm and the distance of the individual micro-craters to one another ranges from 0.25 to 0.8 mm.

In contrast to the flaming, granulating, and blasting methods, laser structuring is a non-contact surface finishing method. The structure may be both be regular and specifically irregular and is characterized by the negligible damage to the overall surface. The hardness and composition of the material are of no importance. The method is characterized by good controllability of parameters, i.e., density, depth and diameter of the micro-craters can be varied randomly. Thus the slip-retarding effect can be developed to a larger or smaller degree. Based on national and international research results, a friction value of $\mu=0.43$ between shoe or sole and floor covering is adequately safe and thus deemed slip-resistant [Fb 701—Test comparison of instantaneous coefficient of friction on floor coverings (publication of Federal Institute of Employment Safety)]. This value is always achieved or exceeded. This enables an evaluation and classification according to [DIN 51130—Determining slip-resistant characteristics—work areas and spaces with an elevated slip risk—walk method—sloping area, ZH 1/571—Explanatory notes on floor coverings used in work areas and spaces with slip risk] and GUV 26.17—Explanatory notes of the Federal Association of Public Accident Insurance Carriers BAGUV—on floor coverings for barefoot walking areas in which wetness occurs].

This certainly excludes a destruction of the microscopic optical effect of the floor covering surface, such as stone. For this reason, the application preferably refers to polished or smooth, shiny surfaces.

The advantage laser processing offers compared with chemical processing of mineral floor coverings with a hydrofluoric acid substance is that these floor coverings can be directly integrated in the floor covering production process, including tiles of natural stone (slip-resistant ex works). This means that architects or builders are able to test the characteristics of these materials, such as natural stone covering, prior to installation. No subsequent treatment and optical change of the floor covering is necessary.

Laser processing is non-polluting, because no chemical substances are used. In terms of composition, the resulting waste products are defined substances corresponding to the starting material which one can easily suck off and dispose. This method can be applied to all floor coverings which are not adequately slip-resistant.

In contrast to existing coating methods for improving the anti-slip effect, laser structuring offers longer durability. Abrasion is considerably lower than with additional coating which does not have the hardness of the primary rock.

As a result of the invention, a method is realized which eliminates the aforesaid disadvantages, permits application in various floor coverings, as well as integration in the production process of floor coverings.

According to the invention, micro-craters are produced with suction effect by means of laser pulses. The parameters
  spot diameter (determines lateral expansion of the suction cups);
  period of reaction and pulse energy (determine depth of craters and, in connection with the wave length of the laser, the type of interaction (evaporation/melting), as well as the,
  distance of the locations of reaction (number and configuration of craters),
which are essential for obtaining the effects, are easily controllable and can thus be adapted to the respective material and the effects to be obtained with respect to the optical impression and the coefficient of friction.

The aforesaid parameters can preferably be so controlled that the removal of material essentially occurs without melting, in order to avoid the creation of large melted spaces and blunt edges, for otherwise the suction effect will be impaired. A high energy is to be achieved in a very short period, while taking into consideration the dependence of material.

Shape, depth and width can be so adjusted that a preferably lens-shaped or flat depression is created whose depth does not exceed half its width, and the depth does not exceed the maximal lateral expansion of the crater, so that no permanent adhesion of dirt occurs. The scanning or deflection of the laser beam across the surface is performed with aggregates which are not part of the invention, such as a laser unit for lettering or surface inspection (scanner or polygon mirror in connection with plane field optics).

The configuration of the craters may be regular or irregular, while, if a higher degree of slip resistance is required, the regular configuration is advantageous, and the irregular configuration of micro-craters with suction effect is advantageous for negligible optical impairment of the polished surface.

The method can be improved in that, by using a suitable sensory device (e.g., photo-optical scanning) the surface finish (e.g., color) and/or the local material composition (e.g., material specific absorption and/or reflection) can be recorded at the processing site, and these signals can be used for controlling the laser source (e.g., pulse energy). This would also enable the interruption of processing with surfaces which optically are worth preserving (e.g., specific crystal types in natural stone).

The inventive solution contains a flexible, non-polluting method for manufacturing slip-resistant smooth floor coverings according to demand and requirement (e.g., polished, mineral floor tiles, plastic coatings and similar) which maintains optical and representative characteristics, while producing on the surface a required number of preferably lens-shaped micro-suction cups, which are not visible to the human eye, with the required surface geometry and distribution, under the effect of pulsed laser irradiation. This slip-resistant equipment, which satisfies demand and requirement, including adaptation to the material, is attained by the variation and/or selection of the laser radiation parameters, spot diameters, wave length, pulse energy, period of reaction and distance of the micro-suction cups. Further, the parameters are to be so selected that the removal effect preferably occurs by evaporation of the material at the location of reaction (e.g., the color of individual floor components forming the surface and/or the local chemical composition, for instance, of crystals in mineral floor coverings), and this information can be used for controlling the laser parameters and/or the geometric configuration of the locations where the laser reaction occurs, including recesses of partial sections of the surface.

A great advantage of the inventive method is that it can easily be integrated in the production process of floor coverings.

All disadvantages of the prior art can be eliminated with this invention.

List of References and Terms
1 Laser beam
2 Focus mirror
3 Workpiece/floor tile
t Generated depth of micro-craters
a Distance of micro-craters to one another
$d_w$ Generated diameter of micro-craters=spot diameter
$V_y$ Deflection speed of laser beam
$V_x$ Rate of feed of floor tile/workpiece in x-direction

What is claimed is:
1. A method for producing a non-slip floor covering, which comprises:
  directing a pulsed laser beam onto a surface of the floor covering;
  forming a micro-crater on the surface of the floor covering with the directed pulsed laser beam; and
  repeating the directing and the forming to produce a plurality of micro-craters over the surface of the floor covering.

2. The method in accordance with claim 1, which comprises:
adjusting the laser beam as a function of the material of the floor covering; and
forming a micro-crater includes evaporating the material of the floor covering in accordance with the adjusted laser beam.

3. The method in accordance with claim 2, which comprises:
selecting a pulse energy range for the laser beam between 0.4 mJ and 1.5 mJ,
selecting a pulse length for the laser beam between 50 ns and 250 ns,
directing the pulsed laser beam onto a surface of the floor covering which comprises a highly-polished stone material,
wherein the micro-crater has a diameter between 0.05 mm and 0.2 mm, and
repeating the directing and the forming to produce a plurality of micro-craters such that a distance between adjacent micro-craters is between 0.25 and 0.8 mm.

4. The non-slip floor covering produced by the method of claim 3.

5. The method in accordance with claim 3, which comprises:
selecting a pulse energy range for the laser beam between 0.4 mJ and 1.5 mJ,
selecting a pulse length for the laser beam between 50 ns and 250 ns,
directing the pulsed laser beam onto a surface of the floor covering which comprises a highly-polished natural stone material,
wherein the micro-crater has a diameter between 0.05 mm and 0.2 mm, and
repeating the directing and the forming to produce a plurality of micro-craters such that the distance between adjacent micro-craters is between 0.25 and 0.8 mm.

6. The non-slip floor covering produced by the method of claim 5.

7. The method in accordance with claim 1, which comprises:
moving the laser beam in a first direction across the floor covering with one of a scanning device and deflection optics, and
moving the floor covering in a second direction with a transport device for the floor covering,
wherein the first direction is substantially perpendicular to the second direction.

8. The method in accordance with claim 1, wherein directing a pulsed laser beam includes deflecting the pulsed laser beam with a focus mirror and positioning the focus mirror to concentrate the pulsed laser beam onto the surface of the floor covering.

9. The method in accordance with claim 1, further comprising the floor covering being composed of a mineral material selected from granite, stone or ceramic and the plurality of micro-craters being one of randomly distributed and regularly distributed.

10. The non-slip floor covering produced by the method of claim 1.

11. The non-slip floor covering of claim 10, the plurality of micro-craters being one of regularly and randomly distributed over the surface of the floor covering.

12. The non-slip floor covering of claim 10, further comprising the plurality of micro-craters, some of which being flat micro-craters.

13. The non-slip floor covering of claim 10, the plurality of micro-craters being substantially invisible to a human eye.

14. The non-slip floor covering of claim 10, the plurality of micro-craters, some of which being sharp-edged.

15. The non-slip floor covering of claim 10, the plurality of micro-craters, some of which having a lens-shaped geometry.

16. The non-slip floor covering of claim 10, the plurality of micro-craters, some of which having a maximal width of 0.4 mm and a depth of between 0.01 and 0.2 mm.

17. The non-slip floor covering of claim 10, the plurality of micro-craters including more than 100 micro-craters per $cm^2$.

18. The non-slip floor covering of claim 17, further comprising the floor covering being composed of a mineral material.

19. The non-slip floor covering of claim 18, further comprising the mineral material being composed of granite, and
the plurality of micro-craters including more than 250 depressions per $cm^2$.

20. The non-slip floor covering of claim 10, further comprising the floor covering being composed of a mineral material.

21. The non-slip floor covering of claim 20, further comprising the mineral material being selected from granite, stone or ceramic.

22. The non-slip floor covering of claim 10 having an optimal optical quality wherein the covering's loss of shine is less than 11%.

* * * * *